US011799667B1

(12) United States Patent
Nagy et al.

(10) Patent No.: US 11,799,667 B1
(45) Date of Patent: Oct. 24, 2023

(54) SYSTEMS AND METHODS TO IDENTIFY A PHYSICAL OBJECT AS A DIGITAL ASSET

(71) Applicant: Microgroove, LLC, Sammamish, WA (US)

(72) Inventors: Brett Laszlo Nagy, Seattle, WA (US); Philip Gerard Coady, Sammamish, WA (US)

(73) Assignee: Microgroove, LLC, Sammamish, WA (US)

( * ) Notice: Subject to any disclaimer, the term of this patent is extended or adjusted under 35 U.S.C. 154(b) by 0 days.

(21) Appl. No.: 18/061,708

(22) Filed: Dec. 5, 2022

(51) Int. Cl.
 *H04L 9/32* (2006.01)
 *H04L 9/08* (2006.01)

(52) U.S. Cl.
 CPC .......... *H04L 9/3247* (2013.01); *H04L 9/088* (2013.01)

(58) Field of Classification Search
 None
 See application file for complete search history.

(56) References Cited

U.S. PATENT DOCUMENTS

| | | | | |
|---|---|---|---|---|
| 8,171,567 | B1* | 5/2012 | Fraser | G06K 7/10792 726/32 |
| 10,002,277 | B1* | 6/2018 | Endress | H04L 9/3278 |
| 10,193,695 | B1* | 1/2019 | Endress | G06F 18/214 |
| 10,438,162 | B2* | 10/2019 | Sharma | G06Q 10/0833 |
| 10,523,443 | B1* | 12/2019 | Kleinman | H04L 9/30 |
| 10,769,715 | B1* | 9/2020 | Coady | H04L 67/02 |
| 11,444,338 | B1* | 9/2022 | Dhawan | H01M 50/569 |
| 2006/0097046 | A1* | 5/2006 | Baru Fassio | G08B 13/2462 340/8.1 |
| 2007/0143853 | A1* | 6/2007 | Tsukamoto | H04L 63/20 705/64 |

(Continued)

OTHER PUBLICATIONS

Wang et al.; BEI-TAB: Enabling Secure and Distributed Airport Baggage Tracking with Hybrid Blockchain-Edge System; IEEE (Year: 2021).*

(Continued)

*Primary Examiner* — Amare F Tabor
*Assistant Examiner* — Mahabub S Ahmed
(74) *Attorney, Agent, or Firm* — ESPLIN & ASSOCIATES, PC

(57) ABSTRACT

Systems and methods to personalize offers for presentation to users are disclosed. Exemplary implementations may include a wireless chipset including an adhesive layer; electronic storage storing a unique identifier, a manufacturer identifier, a digital signature, and an encryption key; a wireless transducer; and one more processors. The one or more processors may be configured to effectuate transmission of identification information; receive challenge information; encrypt challenge information, such that encrypted response information is generated; and effectuate transmission of the encrypted response information. Exemplary implementations may include one or more processors configured to: receive the identification information; verify the identification information identifies an authentic wireless chipset; send challenge information to the wireless chipset; receive and verify encrypted response information; determine a storage system address on a remote file storage system associated with the wireless chipset; and identify a digital asset on a distributed ledger correlated with the storage system address.

12 Claims, 5 Drawing Sheets

(56) References Cited

U.S. PATENT DOCUMENTS

| | | | |
|---|---|---|---|
| 2009/0225985 A1* | 9/2009 | Dolev | H04L 9/3273 380/28 |
| 2009/0282259 A1* | 11/2009 | Skoric | G06Q 20/341 726/20 |
| 2015/0120534 A1* | 4/2015 | Cardwell | G06Q 20/12 705/330 |
| 2015/0134552 A1* | 5/2015 | Engels | G06Q 10/087 705/318 |
| 2016/0085955 A1* | 3/2016 | Lerner | H04L 9/0869 726/20 |
| 2016/0253622 A1* | 9/2016 | Sriram | H04L 9/3247 713/179 |
| 2016/0375733 A1* | 12/2016 | Lesesky | B60C 23/0494 340/442 |
| 2017/0046806 A1* | 2/2017 | Haldenby | H04L 9/0861 |
| 2018/0108024 A1* | 4/2018 | Greco | H04W 4/029 |
| 2018/0144298 A1* | 5/2018 | Rankin | H04L 9/3236 |
| 2018/0174097 A1* | 6/2018 | Liu | G06Q 10/0833 |
| 2018/0189528 A1* | 7/2018 | Hanis | G06Q 30/0185 |
| 2019/0120929 A1* | 4/2019 | Meadow | G01S 5/14 |
| 2019/0205894 A1* | 7/2019 | Gonzales, Jr. | G06F 21/62 |
| 2019/0220919 A1* | 7/2019 | Martinez | G06K 19/0723 |
| 2019/0312734 A1* | 10/2019 | Wentz | H04L 9/0877 |
| 2019/0334730 A1* | 10/2019 | Endress | H04L 9/3247 |
| 2020/0051015 A1* | 2/2020 | Davis | G06Q 10/0833 |
| 2020/0118117 A1* | 4/2020 | McManus | H04L 9/0643 |
| 2020/0169889 A1* | 5/2020 | Oostdijk | H04W 12/00 |
| 2020/0184291 A1* | 6/2020 | Tisdel | G06K 19/07758 |
| 2020/0288284 A1* | 9/2020 | Klein | H04W 4/70 |
| 2020/0364817 A1* | 11/2020 | Liu | H04L 67/04 |
| 2021/0029100 A1* | 1/2021 | Bendersky | H04L 63/0876 |
| 2021/0089514 A1* | 3/2021 | Werner | G06F 21/64 |
| 2021/0091960 A1* | 3/2021 | Werner | H04L 9/50 |
| 2021/0103938 A1* | 4/2021 | Bulawski | H04W 12/47 |
| 2021/0133728 A1* | 5/2021 | Kinney | G06Q 30/08 |
| 2021/0165822 A1* | 6/2021 | Blackburn | G06V 20/17 |
| 2021/0194707 A1* | 6/2021 | Aronson | G06F 21/602 |
| 2021/0243038 A1* | 8/2021 | Wilson | H04L 9/3247 |
| 2021/0248653 A1* | 8/2021 | McKenzie | G06F 21/44 |
| 2021/0295454 A1 | 9/2021 | Mayuzumi | |
| 2021/0390509 A1* | 12/2021 | Fowler | G06F 16/23 |
| 2022/0006651 A1* | 1/2022 | Soundararajan | H04W 12/069 |
| 2022/0058212 A1* | 2/2022 | Janmohamed | G06F 16/29 |
| 2022/0058610 A1* | 2/2022 | Bedford | G06Q 20/065 |
| 2022/0188821 A1* | 6/2022 | Blackburn | G06Q 20/065 |
| 2022/0366061 A1* | 11/2022 | Spivack | H04L 9/3271 |
| 2022/0398601 A1* | 12/2022 | Anastas | G06K 19/0723 |
| 2023/0019729 A1* | 1/2023 | Karp | H04L 9/0836 |
| 2023/0032099 A1* | 2/2023 | Zheng | H04L 9/14 |
| 2023/0037251 A1* | 2/2023 | Xu | H04L 63/10 |
| 2023/0045774 A9* | 2/2023 | Gunther | G09B 19/18 |
| 2023/0070389 A1* | 3/2023 | Madhusudhan | G06Q 20/3276 |
| 2023/0176246 A1* | 6/2023 | Blackburn | G01W 1/00 702/3 |

OTHER PUBLICATIONS

Jangirala et al.; mDesigning Secure Lightweight Blockchain-Enabled RFID-Based Authentication Protocol for Supply Chains in 5G Mobile Edge Computing Environment; IEEE (Year: 2019).*

Muruganantham et al.; Smart Airline Baggage Tracking and Theft Prevention with Blockchain Technology; Published by: The Mattingley Publishing Co., Inc. (Year: 2020).*

Pablo Escobedo et al., "Smart Bandage With Wireless Strain and Temperature Sensors and Batteryless NFC Tag"; IEEE Internet of Things Journal; Mar. 15, 2021; (5093-5100 ).

"NFT Blockchain and NFC chip identification for physical objects to avoid falsification"; Zertifier; Nov. 8, 2021; (1-12); retrieved from the internet on Dec. 5, 2022.

* cited by examiner

SYSTEMS AND METHODS TO IDENTIFY A PHYSICAL OBJECT AS A DIGITAL ASSET

FIELD OF THE DISCLOSURE

The present disclosure relates to systems and methods for using a distributed ledger to track, monitor, and/or authenticate a physical object via a wireless chipset affixed to the physical object that has been previously correlated with a digital asset on the distributed ledger.

BACKGROUND

Wireless chipsets for sending and receiving data are known. Distributed ledgers are known techniques to produce a secure record of ownership or rights associated with particular assets. Many types of digital assets are known.

SUMMARY

Validating authenticity of physical objects may be helpful to identify and/or determine value of physical objects. Affixing a wireless chipset to a physical object may provide a mechanism for validating the authenticity of the physical object. Client computing platforms may be configured to scan such a chipset. Scanning the chipset may enable client computing platforms to validate authenticity of an individual physical object through verification of identification information stored on the chipset and verification of encryption of challenge information by the chipset. Responsive to verification of the chipset, the client computing platform may be configured to identify a digital asset stored on a distributed ledger and correlated with the chipset. The chipset may include other functionality beyond stored information and/or communications capabilities that facilitate validation of authenticity. Such functionality may include recording information to storage on the chipset. The information may include information input by users, generated by sensors, received via wireless transmission, and/or obtained in other ways. The recorded information may reflect location of, conditions surrounding, motion of, motion around, actions taken with respect to, and/or other information related to the physical object. The client computing platforms may be configured to receive information from the chipsets and store the information. The information may be stored to the distributed ledger, may be stored off the distributed ledger and correlated to the digital asset, and/or stored or processed in other ways. The client computing platforms may be configured to retrieve historical information regarding the physical object from storage (e.g., on the distributed ledger and/or after locating the historical information via its correlation with the digital asset, etc.).

One aspect of the present disclosure relates to a wireless chipset configured to store information and/or communicate information with a client computing platform that facilitates validation of authenticity of the wireless chipset. The wireless chipset may include an adhesive layer, non-transitory electronic storage, and one or more hardware processors. The adhesive layer may be disposed on an external surface of the wireless chipset. The adhesive layer may facilitate affixation of the wireless chipset to a surface of a carrier object. The non-transitory electronic storage may store a unique identifier, a manufacturer identifier, a digital signature, an encryption key, and/or other information. The unique identifier and the manufacturer identifier may be stored on a remote file storage system at a storage system address on the remote file storage system. The storage system address may be correlated with a digital asset on a distributed ledger. In some implementations, the wireless chipset may include a wireless transducer. The wireless transducer may be configured to communicate information via a wireless protocol. By way of non-limiting example, the wireless chipset may communicate information with a client computing platform via a near-field wireless protocol, a Bluetooth connection, a shared Wi-Fi network with the client computing platform, and/or other wireless communication methods.

The one or more hardware processors may be configured to effectuate transmission of identification information to a client computing platform via the wireless transducer. The identification information may include one or more of the unique identifier, the manufacturer identifier, the digital signature, and/or other information. The one or more hardware processors may be configured to receive communication including challenge information via transmission from the client computing platform to the wireless transducer. The one or more hardware processors may be configured to encrypt the challenge information using the encryption key, such that the encrypted response information is generated. The one or more hardware processors may be configured to effectuate transmission of the encrypted response information to the client computing platform for validation via the wireless transducer. The validation may validate authenticity of the wireless chipset.

Another aspect of the present disclosure relates to a system configured to validate authenticity of a wireless chipset and identify a digital asset stored on a distributed ledger correlated with the wireless chipset. In some implementations, the wireless chipset may include a wireless transducer configured to communicate information via a wireless protocol. By way of non-limiting example, the wireless chipset may communicate information with a client computing platform via a near-field wireless protocol, a Bluetooth connection, a shared Wi-Fi network with the client computing platform, other wireless communication methods. The system may include one or more hardware processors configured by machine-readable instructions. The one or more hardware processors may be configured to receive the identification information from the wireless chipset affixed to a carrier object. The one or more hardware processors may be configured to verify the identification information identifies an authentic wireless chipset, responsive to receiving the identification information from the wireless chipset. The one or more hardware processors may be configured to send challenge information to be encrypted by the wireless chipset for verification of authenticity of the wireless chipset. The one or more hardware processors may be configured to receive the encrypted response information from the wireless chipset. The one or more hardware processors may be configured to verify the challenge information has been encrypted as expected by the wireless chipset, responsive to receiving the encrypted response information from the wireless chipset. The one or more hardware processors may be configured to determine a storage system address on a remote file storage system associated with the wireless chipset by virtue of having received the identification information of the wireless chipset. The one or more hardware processors may be configured to identify a digital asset on a distributed ledger. The digital asset may be correlated with the storage system address.

Another aspect of the present disclosure relates to a method to validate authenticity of a wireless chipset affixed to a physical object and to identify a digital asset correlated with the wireless chipset. The method may include receiving identification information from a wireless chipset. The method may include verifying the identification information identifies an authentic wireless chipset. The method may include sending challenge information to be encrypted by the wireless chipset for verification of authenticity of the wireless chipset. The method may include receiving the encrypted response information from the wireless chipset. The method may include verifying the challenge information has been encrypted as expected by the wireless chipset. The method may include determining the storage system address on the remote file storage system associated with the wireless chipset by virtue of having received the identification information of the wireless chipset. The method may include identifying the digital asset on the distributed ledger that is correlated with the storage system address.

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect, both local and remote. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

DETAILED DESCRIPTION

Figure 1:
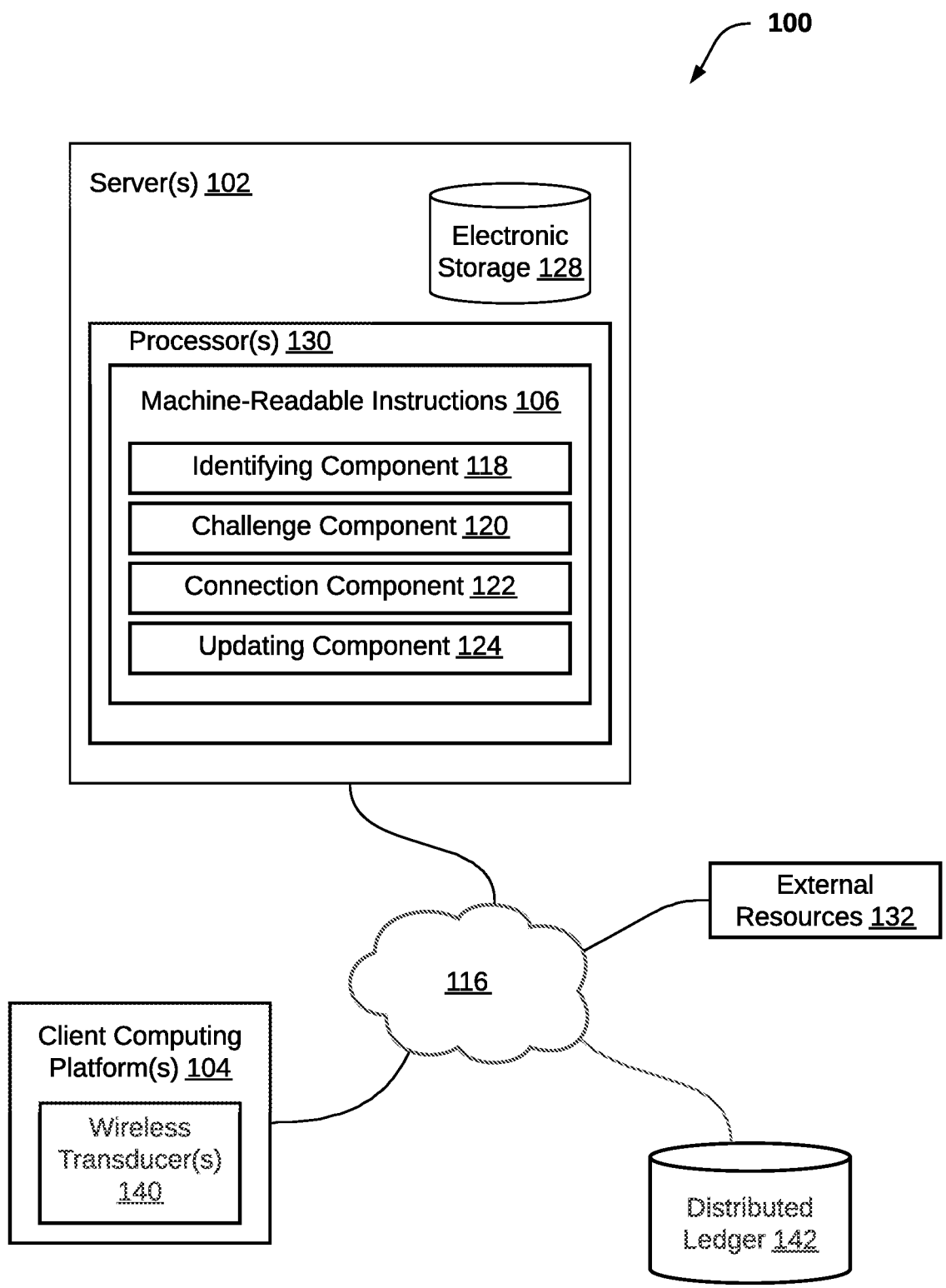
FIG. 1 illustrates a system configured to identify a physical object as a digital asset, in accordance with one or more implementations.

FIG. 1 illustrates a system 100 configured to validate authenticity of a wireless chipset and identify a digital asset stored on a distributed ledger correlated with the wireless chipset, in accordance with one or more implementations. In some implementations, system 100 may include one or more servers 102. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Client computing platform(s) 104 may include wireless transducer(s) 140. Users may access system 100 via client computing platform(s) 104.

Server(s) 102 may be configured by machine-readable instructions 106. Machine-readable instructions 106 may include one or more instruction components. The instruction components may include computer program components. The instruction components may include one or more of identifying component 118, challenge component 120, connection component 122, updating component 124, and/or other instruction components.

Identifying component 118 may be configured to receive identification information from a wireless chipset. The identification information may include one or more of a unique identifier of the wireless chipset, a manufacturer identifier of the wireless chipset, a digital signature, and/or other information. The identification information may be stored in the wireless chipset when the wireless chipset is manufactured. In some implementations, the identification information may be received responsive to scanning the wireless chipset.

By way of non-limiting example, scanning the wireless chipset may include wireless transducer(s) 140 being near a wireless transducer of the wireless chipset. Wireless transducer(s) 140 being near a wireless transducer of the wireless chipset may include one or more wireless transducers 140 being within 4 centimeters, 1 inch, 6 inches, 1 foot, the same room, the same building, and/or other measures of distance with the wireless transducer of the wireless chipset. In some implementations, the wireless chipset may include a visible image of a computer-readable optical code (e.g., a QR code, a bar code, and/or other optical codes). Scanning the wireless chipset including a visible image of a computer-readable optical code may include a client computing platform capturing an image, video, and/or other visual representations of the computer-readable optical code using a camera and/or other imaging hardware, software, and/or firmware.

In some implementations, the wireless chipset may be a wireless communication chipset. Wireless transducer(s) 140 being near the wireless transducer of the wireless chipset may enable information to transfer between system 100 and the wireless chipset. In some implementations, the wireless chipset may communicate information with a client computing platform via a near-field wireless protocol, a Bluetooth connection, a shared Wi-Fi network with the client computing platform, and/or other wireless communication methods.

Identifying component 118 may be configured to verify the identification information identifies an authentic wireless chipset. The identifying component 118 may verify the identification information responsive to receiving the identification information. Verifying the identification information may include determining whether and/or not the unique identifier and the manufacturer identifier correspond to an individual authentic chipset. In some implementations, the identification information may include a password, a URL, and/or other information. Verifying the identification information may include verifying some or all of the information stored in the wireless chipset. In some implementations, the digital signature may be used to validate one or more of the forms of information included in the identification information. Verifying the identification information may include determining whether and/or not the digital signature may be expected for the individual authentic chipset and/or whether and/or not one or more signed forms of information have an appropriate digital signature.

Challenge component 120 may be configured to send challenge information to the wireless chipset. The challenge information may be sent via wireless transducer 140. The challenge information may be sent to the wireless chipset to be encrypted by the wireless chipset for verification of authenticity of the wireless chipset. The challenge information may be sent while wireless transducer 140 is near the wireless transducer of the wireless chipset. By way of non-limiting example, the challenge information may be created according to a time the challenge information is sent, a time the wireless chipset is scanned, and/or other times. The challenge information may be encrypted by the wireless chipset. The wireless chipset encrypting the challenge information may generate encrypted response information.

Challenge component 120 may be configured to receive the encrypted response information from the wireless chipset. The encrypted response information may be generated by the wireless chipset encrypting the challenge information using an encryption key. Challenge component 120 may be configured to verify the challenge information has been encrypted as expected by the wireless chipset, responsive to receiving encrypted response information. In some implementations, verifying the challenge information has been encrypted as expected may include decrypting the encrypted response information using a decryption key to generate decrypted response information. The decryption key may be the same as or different than the encryption key. Verifying the challenge information has been encrypted as expected may include determining the decrypted response information is the same as the challenge information. In other implementations, verifying the challenge information has been encrypted as expected may include encrypting the challenge information using an encryption key to generate solution challenge information. Verifying the challenge information has been encrypted as expected may include comparing the solution challenge information to the encrypted response information.

Connection component 122 may be configured to determine a storage system address on a remote file storage system associated with the wireless chipset. The remote file storage system may be a distributed data storage system. The remote file storage system may user a peer-to-peer architecture. By way of non-limiting example, the remote file storage system may be the InterPlanetary File System (IPFS) and/or other file storage systems. In some implementations, connection component 122 may use the identification information in order to determine the storage system address. By way of non-limiting example, using the identification information may include identifying a file in the remote file storage system storing some or all of the identification information stored in the remote file storage system.

Connection component 122 may be configured to identify a digital asset on a distributed ledger. The digital asset may be correlated with the storage system address. By virtue of this correlation, identifying the digital asset may include identifying a digital asset correlated with the storage system address. The digital asset may be used to represent and/or track information regarding a carrier object of the wireless chipset. By way of non-limiting example, the digital asset may track a chain of ownership of the carrier object.

As used herein, the term "digital asset" may refer to an alphanumeric code tracked on one or more distributed ledgers. The digital assets may be uniquely identified and/or uniquely identifiable. As used herein, rights pertaining to digital assets may be tracked, recorded, and/or otherwise registered on one or more distributed ledgers. As such, an individual digital asset may be a registry-tracked digital asset.

Individual digital assets may be associated and/or correlated with another entity (which may be referred to as a "correlated entity") by virtue of technology provided and/or supported by the one or more distributed ledgers on which the rights pertaining to the individual digital assets are tracked (including but not limited to smart contracts and/or other executable code on the one or more distributed ledgers). Accordingly, rights pertaining to a digital asset may correlate to the provision of one or more rights (e.g., accessibility) with respect to the correlated entity (e.g., control and/or other accessibility). Transactions involving a digital asset recorded on a distributed ledger may correlate to certain transactions (or modifications) of the correlated entity, and/or vice versa.

Various types and/or combinations of correlated entities are envisioned within the scope of this disclosure, including but not limited to physical and/or virtual objects, content, items, rights, memberships, grants, etc. The use of the singular "entity" or "correlated entity" is not intended to be limiting, as multiple different objects, content, items, rights, memberships, grants, etc. may be correlated to a single digital asset. By way of non-limiting example, a correlated entity may be a physical item (e.g., artwork, a ticket to an event), a subscription to certain media content, content and so forth. The content may include an image, a video, a graphic image file, a signature of notoriety, a sound bite of an audio file, the audio file, and/or other content. In some implementations, the correlated entity may refer to any item or object related to art and entertainment for which a user may use, own, sell, trade, loan, destroy, and/or otherwise effectuate a change of ownership, access, or control (including exchanges through challenges).

A digital asset may be fungible if it is functionally and/or physically indistinguishable from another digital asset. A digital asset may be non-fungible if it is unique, or individually identifiable. A digital asset may be semi-fungible if there is a set of a limited number of similar but distinguishable digital assets. For example, a limited amount of images of a sports team for a particular year may be semi-fungible. For example, a digital ticket to a show, concert, exhibition, and/or other event may be semi-fungible. The semi-fungible digital assets are considered as unique, "not fungible", or non-fungible digital assets. In some implementations, the digital assets may include non-fungible tokens, fungible tokens, semi-fungible tokens, and/or other digital assets. As used herein, the term "non-fungible token" or "NFT" may be used to refer to a combination of a particular unique digital asset and one or more particular associated virtual entities to which the particular unique digital asset is associated.

Individual users of one or more client computing platforms 104 may be associated with individual user accounts. The user accounts may indicate addresses on distributed ledger 142 controlled by the individual users. The user accounts may include a first user account associated with a first user. The first user account may control a wallet stored on a first client computing platform. The user accounts may include a second user account associated with a second user.

The wallet may include generation of a private key and an address on distributed ledger 142. The address may be generated based on a public key and a hash function. The public key may be generated based on the private key. The address may be shared to receive consideration. The private key may authorize control of any consideration associated with the public key and the address. The private key may authorize and initiate transactions of the consideration from the address. A secret phrase may be generated based on the private key and may provide access to the consideration at the address. Using the secret phrase to access the consideration at the address includes converting the secret phrase to the private key that it was previously generated from. The secret phrase may be an ordered set of words that represent a human-readable and memorable form of the private key. The secret phrase may be 12, 18, 24, or other amounts of words. The consideration may include one or more currencies, cryptocurrencies, digital assets, and/or other consideration.

The wallet may establish the first user as an owner of one or more digital assets. The first user account may indicate a first address on distributed ledger 142 controlled by the first user. The wallet may include indication of addresses on distributed ledger 142 controlled by the first user. The first user may be an owner of a digital asset associated with the first address. The addresses indicated by the wallet may include the first address.

In some implementations, distributed ledger 142, or distributed ledgers, may be implemented by registry servers or decentralized database servers. The terms "permanent registries" and "distributed ledgers" may be used interchangeably herein. The terms "registry servers" and "decentralized database servers" may be used interchangeably herein. In some implementations, one or more distributed ledgers may be decentralized and/or immutable registries. In some implementations, the one or more distributed ledgers may be one or more databases on which the rights pertaining to the individual digital assets are tracked and/or recorded. In some implementations, blockchains may be maintained by distributed computing platforms (not shown in FIG. 1). In some implementations, a distributed computing platform may be implemented by a set of client computing platforms and/or servers (including, for example, one or more registry servers). The distributed computing platform may support a virtual machine (not shown in FIG. 1). The distributed computing platform and/or the virtual machine may form a runtime environment for smart contracts and/or other executable code. A distributed computing platform may include electronic storage configured to store part or all of individual blockchains. For example, the smart contracts may be stored on one or more blockchains, and/or other distributed ledgers. In some implementations, the distributed computing platform may be Ethereum. In some implementations, the distributed computing platform may be similar to or based on Ethereum. In some implementations, the virtual machine may be a distributed and/or decentralized virtual machine.

In some implementations, at least one of the distributed ledgers may be a private permissioned distributed ledger (e.g., a private permissioned blockchain). The private permissioned distributed ledger may be configured to record information and/or track addresses (e.g., corresponding to digital wallets, smart contracts, etc.). The recorded information may include rights pertaining to the digital assets. For example, ownership rights and/or other accessibility may be modified. In some implementations, the ownership rights and/or other rights may be indicated by addresses, tracked and recorded by the distributed ledgers on the registry servers, that correspond to digital wallets of users and transaction information recorded on the distributed ledger. In some implementations, a digital asset may be removed from one distributed ledger and added or recorded on another distributed ledger. In some implementations, at least one of the distributed ledgers implemented by the registry servers is a public distributed ledger (e.g., a public blockchain). The public distributed ledger may be configured to be part of either Ethereum mainnet, Ethereum 1.5, Ethereum 2.0, or a derivative of Ethereum 2.0 that is configured to perform transactions of Ether (ETH) between accounts.

Elements of a blockchain or another distributed ledger may be grouped together in units that are referred to as blocks. For example, an individual block may include one or more digital assets and one or more transactions. For example, an individual block may be linked to one or more other individual blocks. Individual blocks may be linked or chained together to form a structure of blocks and/or a hierarchy of blocks, such as, e.g., a chain of blocks. An individual block may include one or more digital assets, one or more transactions, smart contracts, and/or other information.

In some implementations, one or more distributed ledgers implemented by the registry servers may be publicly accessible. In some implementations, for example, the one or more databases may be accessible via a mobile application or a website. In some implementations, one or more distributed ledgers implemented by the registry servers may be private and/or permissioned. In some implementations, one or more distributed ledgers implemented by the registry servers may be append-only. In some implementations, existing blocks of one or more distributed ledgers implemented by the registry servers can substantially not be altered or deleted, unless multiple copies are altered. This is unlikely to happen provided that the multiple copies are stored on different computing platforms, e.g., in different geographical locations. Distributed ledgers may be replicated on multiple computing platforms, preferably in multiple different geographical locations. Additionally, individual blocks may be linked together in a manner that prevents tampering, such as, e.g., using a hash chain and/or digital signatures. In particular, hash values may be generated using fixed-output-length one-way hashing functions that take variable-length input, and may be effectively impossible (or, at least, computationally infeasible) to reverse. As such, a hashing function may provide one-way encryption. By way of non-limiting example, the hashing function may be SHA-256, BLAKE2, SHAKE256, and/or another hashing function. Contents of individual blocks, transactions, and/or articles may be digitally signed in a manner that proves integrity and/or prevents tampering, e.g., by providing authentication, as well as non-repudiation.

Updating component 124 may be configured to receive information regarding the carrier object from the wireless chipset. In some implementations, the information regarding the carrier object may include sensor information and/or other information. By way of non-limiting example, the sensor information may include one or more of a temperature, information characterizing a movement, information characterizing an action, an angle, a speed, a humidity value, and/or other information. Updating component 124 may be configured to store the information. The information may be stored to the distributed ledger, may be stored off the distributed ledger and correlated to the digital asset, and/or stored or processed in another way. In some implementations, storing the information on the distributed ledger may associate the information with the digital asset.

Updating component 124 may be configured to retrieve information associated with the digital asset from storage. The information may be retrieved from the distributed ledger, off the distributed ledger and correlated with the digital asset, and/or other storage systems. The information may include sensor information stored on the distributed ledger associated with the digital asset, ownership information, and/or other information. The ownership information may characterize a chain of ownership of the digital asset.

In some implementations, server(s) 102, client computing platform(s) 104, and/or external resources 132 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platform(s) 104, and/or external resources 132 may be operatively linked via some other communication media.

A given client computing platform 104 may include one or more processors configured to execute computer program components. The computer program components may be configured to enable an expert or user associated with the given client computing platform 104 to interface with system 100 and/or external resources 132, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 132 may include sources of information outside of system 100, external entities participating with system 100, and/or other resources. In some implementations, some or all of the functionality attributed herein to external resources 132 may be provided by resources included in system 100.

Server(s) 102 may include electronic storage 128, one or more processors 130, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 128 may comprise non-transitory storage media that electronically stores information. The electronic storage media of electronic storage 128 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 128 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 128 may include one or more virtual storage resources (e.g., cloud storage, a virtual private network, and/or other virtual storage resources). Electronic storage 128 may store software algorithms, information determined by processor(s) 130, information received from server(s) 102, information received from client computing platform(s) 104, and/or other information that enables server(s) 102 to function as described herein.

Processor(s) 130 may be configured to provide information processing capabilities in server(s) 102. As such, processor(s) 130 may include one or more of a digital processor, an analog processor, a digital circuit designed to process information, an analog circuit designed to process information, a state machine, and/or other mechanisms for electronically processing information. Although processor(s) 130 is shown in FIG. 1 as a single entity, this is for illustrative purposes only. In some implementations, processor(s) 130 may include a plurality of processing units. These processing units may be physically located within the same device, or processor(s) 130 may represent processing functionality of a plurality of devices operating in coordination. Processor(s) 130 may be configured to execute components identifying component 118, challenge component 120, connection component 122, updating component 124, and/or other components. Processor(s) 130 may be configured to execute components identifying component 118, challenge component 120, connection component 122, updating component 124, and/or other components by software; hardware; firmware; some combination of software, hardware, and/or firmware; and/or other mechanisms for configuring processing capabilities on processor(s) 130. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 118, 120, 122, and 124 are illustrated in FIG. 1 as being implemented within a single processing unit, in implementations in which processor(s) 130 includes multiple processing units, one or more of components 118, 120, 122, and 124 may be implemented remotely from the other components. The description of the functionality provided by the different components 118, 120, 122, and 124 described below is for illustrative purposes, and is not intended to be limiting, as any of components 118, 120, 122, and 124 may provide more or less functionality than is described. For example, one or more of components 118, 120, 122, and 124 may be eliminated, and some or all of its functionality may be provided by other ones of components 118, 120, 122, and 124. As another example, processor(s) 130 may be configured to execute one or more additional components that may perform some or all of the functionality attributed below to one of components 118, 120, 122, and 124.

Figure 2:
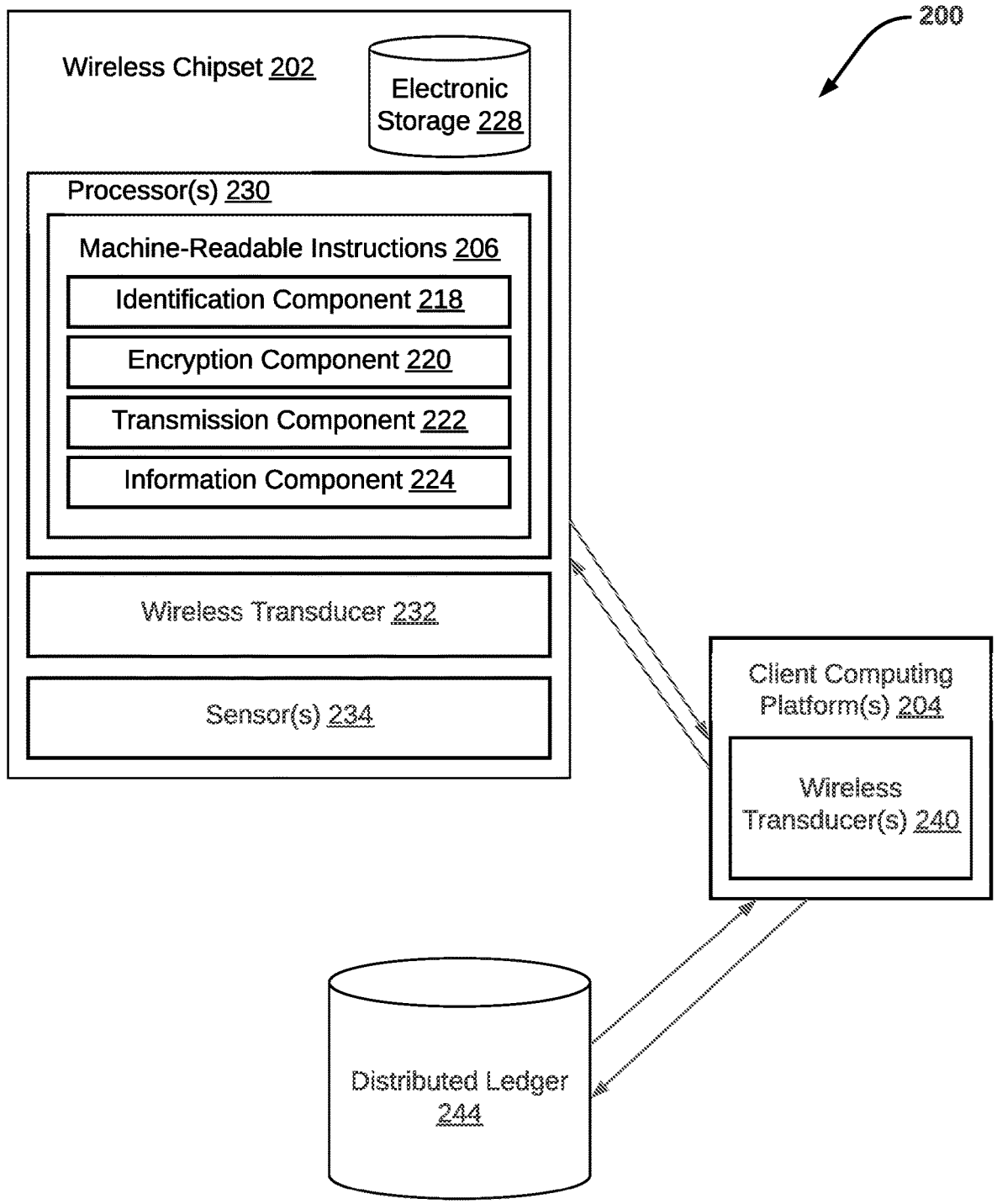
FIG. 2 illustrates a system configured to identify a physical object as a digital asset, in accordance with one or more implementations.

FIG. 2 illustrates a system 200 configured to validate authenticity of a wireless chipset affixed to a physical object and to identify a digital asset correlated with the wireless chipset, in accordance with one or more implementations. In some implementations, system 200 may include a wireless chipset 202, client computing platform(s) 204, and a distributed ledger 244. In some implementations, client computing platform(s) 204 may include wireless transducer(s) 240 and wireless chipset 202 may include wireless transducer 232. Client computing platform(s) 204 may be configured to communicate with wireless chipset 202 via wireless transducer(s) 240. Wireless chipset 202 may be configured to communicate with client computing platform(s) 204 via wireless transducer 232. In some implementations, individual client computing platforms 204 may include a near-field transducer, a Bluetooth transducer, a wireless network adapter, and/or other components enabling wireless communication. Client computing platform(s) 204 may be configured to communicate with distributed ledger 244, and vice versa.

The wireless chipset 202 may include an adhesive layer (not shown), non-transitory electronic storage 228, one or more hardware processors 230, and one or more sensors 234. The adhesive layer may be disposed on an external surface of the wireless chipset 202. The adhesive layer may facilitate affixation of the wireless chipset 202 to a surface of a carrier object.

Figure 4:
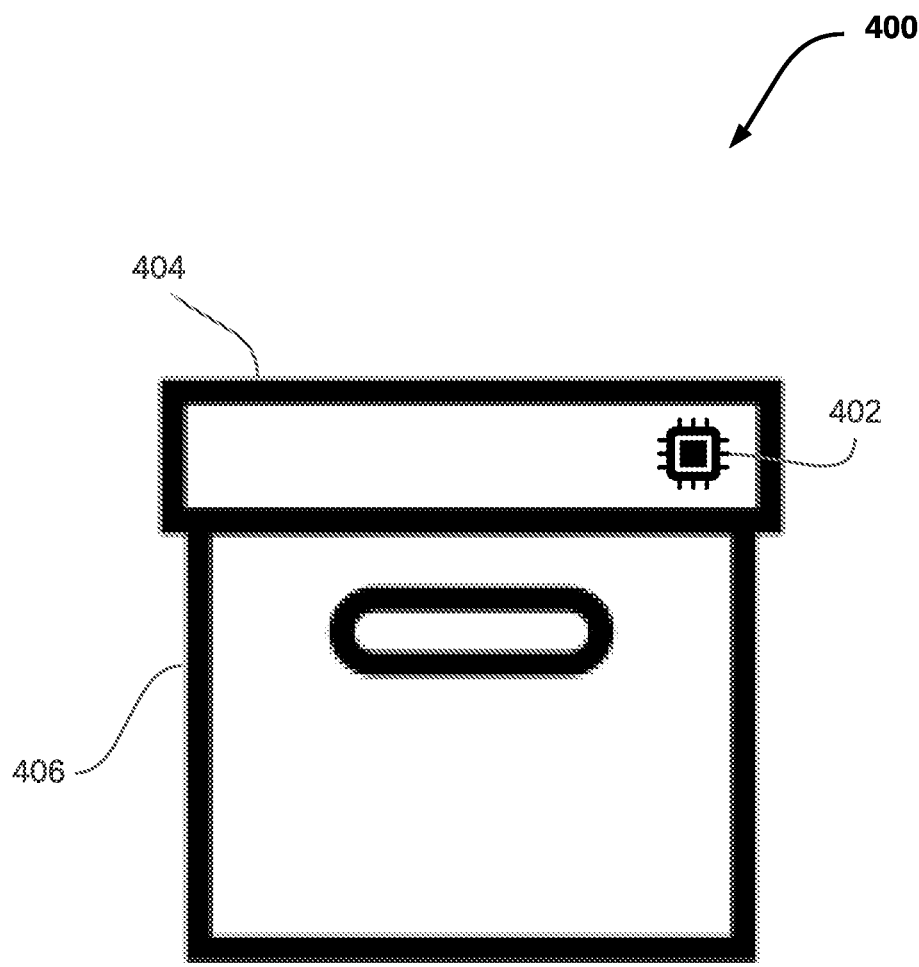
FIG. 4 illustrates a wireless chipset affixed to a physical object, in accordance with one or more implementations.

By way of non-limiting example, FIG. 4 illustrates a wireless chipset 402 affixed to a box 400. Box 400 may be a physical object. Wireless chipset 402 may be affixed to box 400 using an adhesive layer on wireless chipset 402. Wireless chipset 402 may be adhered to a lid 404 of box 400.

Returning to FIG. 2, wireless transducer 232 may be configured to communicate information via a wireless protocol. In some implementations, wireless chipset 202 may include a near-field transducer, a Bluetooth transducer, a wireless network adapter, and/or other components enabling wireless communication. For example, wireless chipset 202 may include a visible image of a computer-readable optical code that maps to information regarding wireless chipset 202.

Non-transitory electronic storage 228 may be configured to store a unique identifier, a manufacturer identifier, a digital signature, and an encryption key. The unique identifier and the manufacturer identifier may be stored on a remote file storage system. The unique identifier may be used to identify wireless chipset 202. The manufacturer identifier may be used to identify a manufacturer of wireless chipset 202. The unique identifier, the manufacturer identifier, the digital signature, and the encryption key may be stored in electronic storage 228 upon manufacture of wireless chipset 202. The unique identifier, the manufacturer identifier, and/or other information may be additionally stored on the remote file storage system using an image file, a text file, a binary file, a hex file, a JSON file, and/or other file types. In some implementations, storing the unique identifier and the manufacturer identifier on the remote file storage system using an image may include recording the unique identifier and the manufacturer identifier using a second file. Storing the unique identifier and the manufacturer identifier on the remote file storage system using an image file may include recording the second file as a computer-readable optical code in the image file. The unique identifier and the manufacturer identifier may be stored in the remote file storage system at a storage system address. The storage system address may be a unique address. The storage system address may be correlated with a digital asset on distributed ledger 244. Electronic storage 228 may be configured to store information regarding the carrier object. The information may include sensor data and/or other information.

Wireless chipset 202 may be configured by machine-readable instructions 206. Machine-readable instructions 206 may include one or more instruction components. The instruction components may include computer program components. The instruction components may include one or more of identification component 218, encryption component 220, transmission component 222, information component 224, and/or other instruction components.

Identification component 218 may be configured to effectuate transmission of identification information to client computing platform(s) 204. The identification information may include one or more of the unique identifier, the manufacturer identifier, the digital signature, and/or other information. In some implementations, the identification information may be transmitted via wireless transducer 232. The identification information may be received by client computing platform 204 via one or more wireless transducers 240. Effectuating transmission of the identification information may be responsive to wireless chipset 202 being scanned by one or more client computing platforms 204. By way of non-limiting illustration, scanning wireless chipset 202 may include one or more wireless transducers 240 being near wireless transducer 232. Wireless transducer 232 being near one or more wireless transducers 240 may enable information to transfer between wireless chipset 202 and one or more client computing platforms 240. In some implementations, scanning wireless chipset 202 may include using another method of wireless communication. By way of non-limiting example, scanning a wireless chipset 202 that includes a wireless network adapter may include one or more client computing platforms 204 connecting to a Wi-Fi network to which wireless chipset 202 is connected. In some implementations, the identification information may be stored on distributed ledger 244 by one or more client computing platforms 204. The digital asset may have been generated with a smart contract using the identification information. The smart contract may be a computer program or protocol stored on distributed ledger 244. In some implementations, the identification information may be stored by one or more client computing platforms 204 separately from the distributed ledger.

Encryption component 220 may be configured to receive communication including challenge information. The communication may be received via transmission from one or more wireless transducers 240 of client computing platform(s) 204 to wireless transducer 232 and/or other wireless communication transducers. In some implementations, the challenge information may be sent while one or more wireless transducers 240 are near wireless transducer 232.

Encryption component 220 may be configured to encrypt the challenge information using the encryption key. Encrypted response information may be generated responsive to encrypting the challenge information.

Transmission component 222 may be configured to effectuate transmission of the encrypted response information to one or more client computing platforms 204 for validation. The encrypted response information may be transmitted via wireless transducer 232 and/or other wireless communication transducers included in wireless chipset 202 to one or more near field transducers 240 and/or one or more other wireless communication transmitters. The validation may confirm authenticity of the wireless chipset 202.

Information component 224 may be configured to record information regarding the carrier object. The information regarding the carrier object may include information recorded by one or more sensors 234. Information component 224 may be configured to store the information obtained from sensor(s) 234 in non-transitory electronic storage 228. Sensor(s) 234 may measure one or more of temperature within the carrier object, temperature surrounding the carrier object, motion of the carrier object, activity regarding the carrier object, humidity surrounding the carrier object, and/or other information. The information regarding the carrier object may include some or all of the information obtained from sensor(s) 234. By way of non-limiting example, the information regarding the carrier object may include information characterizing the carrier object being opened and/or closed.

By way of non-limiting illustration, wireless chipset 402 depicted in FIG. 4 may include one or more sensors. Information regarding carrier box 400 may be measured by the one or more sensors. For example, information measured by a sensor included in wireless chipset 402 may denote a time period box 400 was open, a time period when lid 404 was lifted away from a body 406 of the box, and/or other information regarding box 400. For example, information regarding box 400 may include one or more temperatures inside box 400, outside of box 400, and/or another location with respect to box 400.

Returning to FIG. 2, transmission component 222 may be configured to effectuate transmission of the information regarding the carrier object to client computing platform(s) 204. The information may be transmitted via wireless transducer 232 to one or more wireless transducers 240.

Electronic storage 228 may comprise non-transitory storage media that electronically stores information. The electronic storage media of electronic storage 228 may include one or both of system storage that is provided integrally (i.e., substantially non-removable) with wireless chipset 202 and/or removable storage that is removably connectable to wireless chipset 202 via, for example, a port (e.g., a USB port, a firewire port, etc.) or a drive (e.g., a disk drive, etc.). Electronic storage 228 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 228 may include one or more virtual storage resources (e.g., cloud storage, a virtual private network, and/or other virtual storage resources). Electronic storage 228 may store software algorithms, information determined by processor(s) 230, sensor information received from sensor(s) 234, information received from client computing platform(s) 204, and/or other information that enables wireless chipset 202 to function as described herein.

Wireless chipset 202 may include a plurality of hardware, software, and/or firmware components operating together to provide the functionality attributed herein to wireless chipset 202. For example, wireless chipset 202 may be implemented by a collection of computing platforms operating together as wireless chipset 202.

Processor(s) 230 may be configured to provide information processing capabilities in wireless chipset 202. As such, processor(s) 230 may include one or more of a digital processor, an analog processor, a digital circuit designed to process information, an analog circuit designed to process information, a state machine, and/or other mechanisms for electronically processing information. Although processor(s) 130 is shown in FIG. 2 as a single entity, this is for illustrative purposes only. In some implementations, processor(s) 230 may include a plurality of processing units. These processing units may be physically located within the same device, or processor(s) 230 may represent processing functionality of a plurality of devices operating in coordination. Processor(s) 230 may be configured to execute components identification component 218, encryption component 220, transmission component 222, information component 224, and/or other components. Processor(s) 230 may be configured to execute components identification component 218, encryption component 220, transmission component 222, information component 224, and/or other components by software; hardware; firmware; some combination of software, hardware, and/or firmware; and/or other mechanisms for configuring processing capabilities on processor(s) 230. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 218, 220, 222, and/or 224 are illustrated in FIG. 2 as being implemented within a single processing unit, in implementations in which processor(s) 230 includes multiple processing units, one or more of components 218, 220, 222, and/or 224 may be implemented remotely from the other components. The description of the functionality provided by the different components 218, 220, 222, and/or 224 described below is for illustrative purposes, and is not intended to be limiting, as any of components 218, 220, 222, and/or 224 may provide more or less functionality than is described. For example, one or more of components 218, 220, 222, and/or 224 may be eliminated, and some or all of its functionality may be provided by other ones of components 218, 220, 222, and/or 224. As another example, processor(s) 230 may be configured to execute one or more additional components that may perform some or all of the functionality attributed below to one of components 218, 220, 222, and/or 224.

Figure 3:
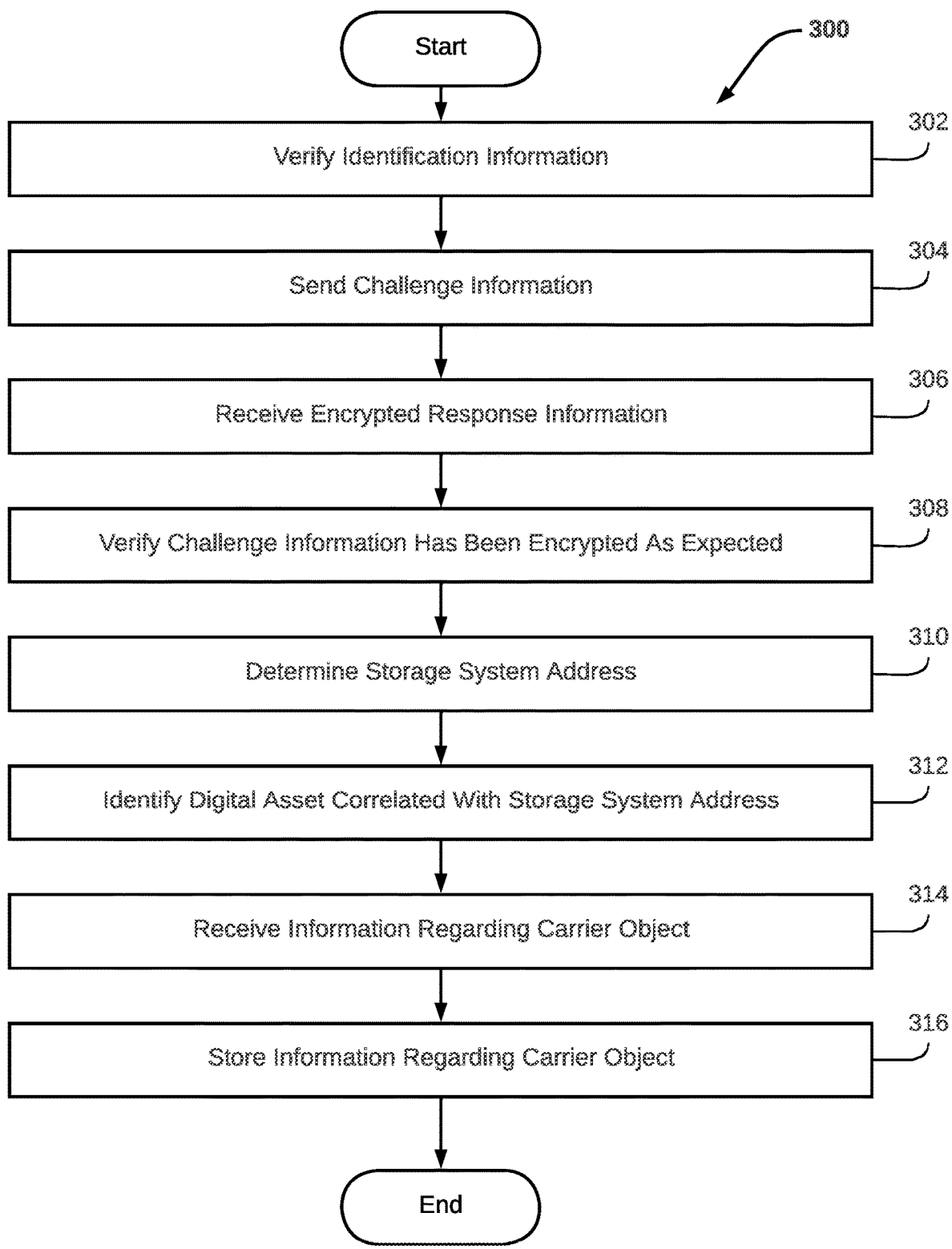
FIG. 3 illustrates a method to identify a physical object as a digital asset, in accordance with one or more implementations.

FIG. 3 illustrates a method 300 to validate authenticity of a wireless chipset affixed to a physical object and to identify a digital asset correlated with the wireless chipset. The operations of method 300 presented below are intended to be illustrative. In some implementations, method 300 may be accomplished with one or more additional operations not described, and/or without one or more of the operations discussed. Additionally, the order in which the operations of method 300 are illustrated in FIG. 3 and described below is not intended to be limiting.

In some implementations, method 300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 300 in response to instructions stored electronically on an electronic storage medium. The one or more processing devices may include one or more devices configured through hardware, firmware, and/or software to be specifically designed for execution of one or more of the operations of method 300.

An operation 302 may include verifying that identification information of a wireless chipset identifies an authentic wireless chipset. The identification information may have been received from the wireless chipset. Operation 302 may be performed by one or more hardware processors configured by machine-readable instructions including a component that is the same as or similar to identifying component 118.

An operation 304 may include sending challenge information to the wireless chipset. The challenge information may be sent for encryption by the wireless chipset. Encryption by the wireless chipset may be for verification of authenticity of the wireless chipset. Operation 304 may be performed by one or more hardware processors configured by machine-readable instructions including a component that is the same as or similar to challenge component 120.

An operation 306 may include receiving encrypted response information from the wireless chipset. The encrypted response information may have been generated by the wireless chipset encrypting the challenge information. Operation 306 may be performed by one or more hardware processors configured by machine-readable instructions including a component that is the same as or similar to challenge component 120.

An operation 308 may include verifying the challenge information has been encrypted as expected by the wireless chipset. Verifying encryption of the challenge information may be responsive to receiving the encrypted response information from the wireless chipset. Operation 308 may be performed by one or more hardware processors configured by machine-readable instructions including a component that is the same as or similar to challenge component 120.

An operation 310 may include determining a storage system address associated with the wireless chipset on a remote file storage system. Determining the storage system address may be done by virtue of having received the identification information of the wireless chipset. Operation 310 may be performed by one or more hardware processors configured by machine-readable instructions including a component that is the same as or similar to connection component 122.

An operation 312 may include identifying a digital asset on a distributed ledger that is correlated with the storage system address. Operation 312 may be performed by one or more hardware processors configured by machine-readable instructions including a component that is the same as or similar to connection component 122.

An operation 314 may include receiving information regarding the carrier object from the wireless chipset. The information may include sensor information retrieved from the wireless chipset. Operation 314 may be performed by one or more hardware processors configured by machine-readable instructions including a component that is the same as or similar to connection component 124.

An operation 316 may include storing the information regarding the carrier object from the wireless chipset. The information may be stored to the distributed ledger, may be stored off the distributed ledger and correlated to the digital asset, and/or stored or processed in other ways. Operation 316 may be performed by one or more hardware processors configured by machine-readable instructions including a component that is the same as or similar to connection component 124.

Figure 5:
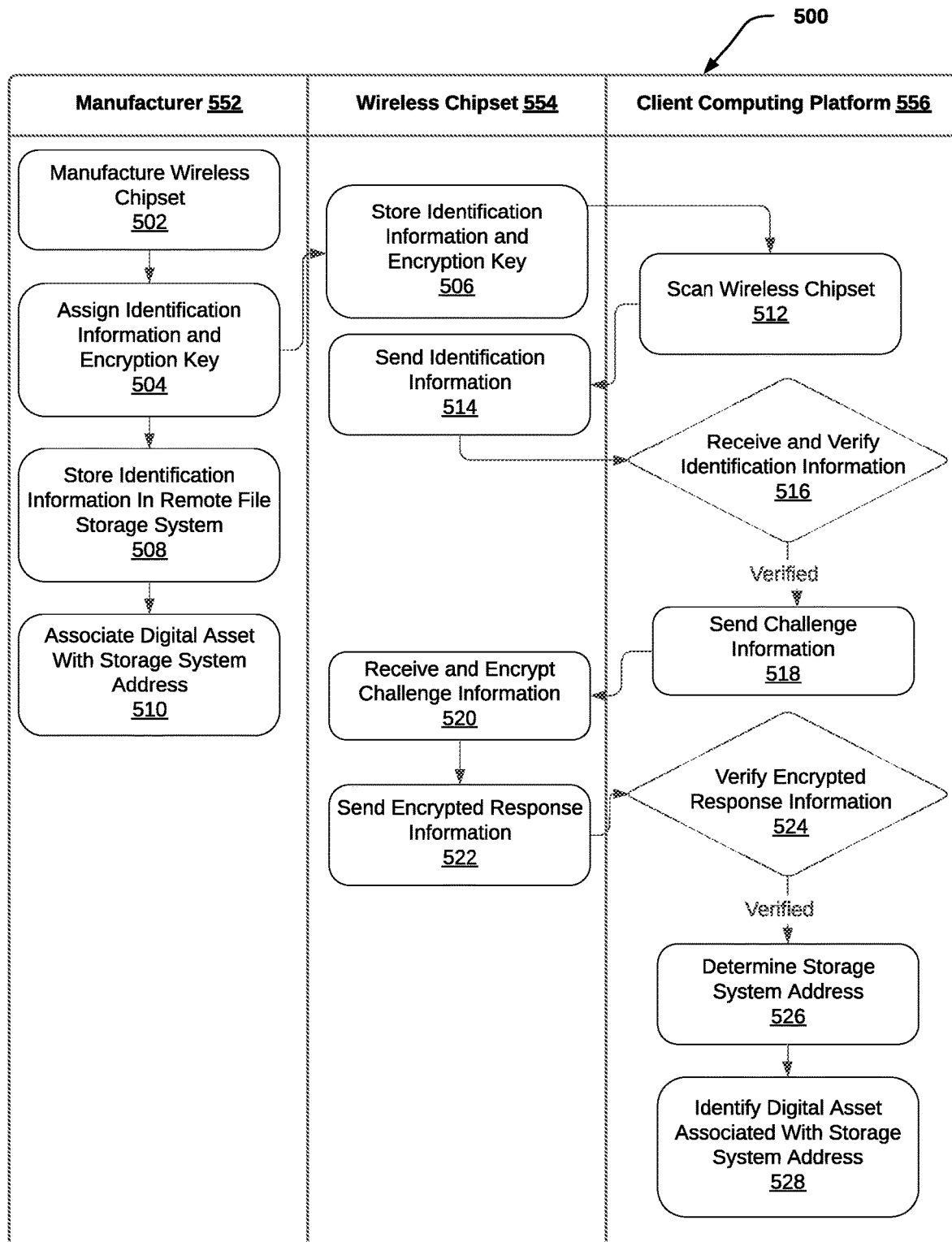
FIG. 5 illustrates a method to manufacture a wireless chipset and to identify a digital asset correlated with the wireless chipset.

FIG. 5 illustrates a method 500 to manufacture a wireless chipset and to identify a digital asset correlated with the wireless chipset. The operations of method 500 presented below are intended to be illustrative. In some implementations, method 500 may be accomplished with one or more additional operations not described, and/or without one or more of the operations discussed. Additionally, the order in which the operations of method 500 are illustrated in FIG. 5 and described below is not intended to be limiting.

In some implementations, operations completed by a manufacturer 552 may be completed by one or more entities. The one or more entities may include a brand producing a wireless chipset 554, a brand selling wireless chipset 554, a factory or other building where wireless chipset 554 is physically manufactured, and/or other entities.

In some implementations, operations completed by wireless chipset 554 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations completed by wireless chipset 554 in response to instructions stored electronically on an electronic storage medium. The one or more processing devices may include one or more devices configured through hardware, firmware, and/or software to be specifically designed for execution of one or more of the operations of method 500.

In some implementations, operations completed by client computing platform 556 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations completed by client computing platform 556 in response to instructions stored electronically on an electronic storage medium. The one or more processing devices may include one or more devices configured through hardware, firmware, and/or software to be specifically designed for execution of one or more of the operations of method 500. By way of non-limiting example some or all of the operations completed by client computing platform 556 may be completed using one or more computer processors included in client computing platform 556 and/or some or all of the operations completed by client computing platform 556 may be completed using one or more computer processors included in one or more servers.

An operation 502 may include manufacturer 552 physically manufacturing a wireless chipset 554. An operation 504 may include manufacturer 552 assigning identification information and an encryption key to wireless chipset 554, responsive to operation 502. The identification information may include a unique identifier specific to wireless chipset 554, a manufacturer identifier specific to manufacturer 552, a digital signature, and/or other information. The encryption key may be assigned uniquely to wireless chipset 554 or assigned to one or more similar chipsets. An operation 508 may include manufacturer 552 storing the identification information in a remote file storage system, responsive to operation 504. Storing the identification information may generate a storage system address, denoting an address of the identification information in the remote file storage system. An operation 510 may include manufacturer 552 associating a digital asset on a distributed ledger with the storage system address. An operation 506 may include wireless chipset 554 storing the identification information and the encryption key to memory on wireless chipset 554, responsive to operation 504.

An operation 512 may include client computing platform 556 scanning wireless chipset 554. An operation 514 may include wireless chipset 554 sending the identification information to client computing platform 556, responsive to operation 512. An operation 516 may include client computing platform 556 receiving the identification information and verifying the identification information identifies an authentic wireless chipset.

An operation 518 may include client computing platform 556 sending challenge information to wireless chipset 554, responsive to successful verification of the identification information (as in operation 516). An operation 520 may include wireless chipset 554 receiving and encrypting the challenge information. Encrypting the challenge information may generate encrypted response information. An operation 522 may include wireless chipset 522 sending encrypted response information to client computing platform 556. An operation 524 may include client computing platform 556 receiving and verifying the encrypted response information. An operation 526 may include client computing platform 556 determining the storage system address, responsive to successful verification of the encrypted response information (as in operation 524). An operation 528 may include client computing platform 556 identifying the digital asset associated with the storage system address, responsive to operation 526.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to validate authenticity of a wireless chipset and identify a digital asset stored on a distributed ledger correlated with the wireless chipset, the system comprising:
    a wireless transducer configured to communicate information via a wireless protocol;
    one or more hardware processors configured by machine-readable instructions to:
        receive, from a wireless chipset affixed to a carrier object, identification information, the identification information including one or more of a unique identifier of the wireless chipset, a manufacturer identifier of the wireless chipset, or a digital signature;
        verify, responsive to receiving the identification information from the wireless chipset, authenticity of the wireless chipset using the identification information;
        send challenge information to be encrypted by the wireless chipset for further verification of authenticity of the wireless chipset;
        receive, from the wireless chipset, encrypted response information, wherein the encrypted response information is generated by the wireless chipset encrypting the challenge information;
        verify, responsive to receiving the encrypted response information from the wireless chipset, the challenge information has been encrypted as expected by the wireless chipset;
        determine, responsive to receiving the identification information of the wireless chipset, a storage system address on a remote file storage system associated with the wireless chipset from the identification information, wherein determining the storage system address includes identifying a file in the remote file storage system storing some or all of the identification information;
        obtain a copy of the file in the remote file storage system from the storage system address in the remote file storage system; and
        determine, from the copy of the file in the remote file storage system, an identifier of a digital asset on a distributed ledger, the digital asset being correlated with the storage system address.

2. The system of claim 1, wherein receiving the identification information is responsive to scanning the wireless chipset, wherein scanning the wireless chipset includes the wireless transducer being near the wireless chipset.

3. The system of claim 1, wherein the one or more hardware processors are further configured to:
    retrieve, from the distributed ledger, information associated with the digital asset.

4. The system of claim 1, wherein the one or more hardware processors are further configured to:
    receive information regarding the carrier object from the wireless chipset; and
    store the information on the distributed ledger, wherein storing the information on the distributed ledger associates the information with the digital asset.

5. A method to validate authenticity of a wireless chipset affixed to a physical object and to identify a digital asset correlated with the wireless chipset, the method comprising:
    receiving, from a wireless chipset, identification information, wherein the wireless chipset includes:
        an adhesive layer disposed on an external surface of the wireless chipset that facilitates affixation of the wireless chipset to a surface of a carrier object,
        non-transitory electronic storage that stores a unique identifier, a manufacturer identifier, a digital signature, and an encryption key, wherein the unique identifier and the manufacturer identifier are also stored on a remote file storage system at a storage system address on the remote file storage system, and wherein the storage system address is correlated with a digital asset on a distributed ledger,
        a wireless transducer configured to communicate information via a wireless protocol, and
        one or more hardware processors,
        and wherein the identification information includes one or more of the unique identifier, a manufacturer identifier, or a digital signature;
    verifying, responsive to receiving the identification information from the wireless chipset, authenticity of the wireless chipset using the identification information;
    sending challenge information to be encrypted by the wireless chipset for further verification of authenticity of the wireless chipset;
    receiving, from the wireless chipset, encrypted response information, wherein the encrypted response information is generated by the wireless chipset encrypting the challenge information;
    verifying, responsive to receiving the encrypted response information from the wireless chipset, the challenge information has been encrypted as expected by the wireless chipset;
    determining, responsive to receiving the identification information of the wireless chipset, a storage system address on a remote file storage system associated with the wireless chipset from the identification information, wherein determining the storage system address includes identifying a file in the remote file storage system storing some or all of the identification information;
    obtaining a copy of the file in the remote file storage system from the storage system address in the remote file storage system; and
    determining, from the copy of the file in the remote file storage system, an identifier of the digital asset on the distributed ledger correlated with the storage system address.

6. The method of claim 5, wherein receiving the identification information is responsive to scanning the wireless chipset, wherein scanning the wireless chipset includes a wireless transducer of a client computing platform being near the wireless transducer of the wireless chipset.

7. The method of claim 5, wherein the method further comprises:
   retrieving information associated with the digital asset stored on the distributed ledger.

8. The method of claim 5, wherein the method further comprises:
   receiving information regarding the carrier object from the wireless chipset; and
   storing the information on the distributed ledger, wherein storing the information on the distributed ledger associates the information with the digital asset.

9. The method of claim 8, wherein the wireless chipset further includes sensors recording activity information of the carrier object or environment surrounding the carrier object, further wherein the non-transitory electronic storage further stores sensor data, the sensor data including information recorded by the sensors, and wherein the information regarding the carrier object includes some or all of the sensor data.

10. The method of claim 5, wherein the identification information is stored on the distributed ledger.

11. The method of claim 10, wherein the digital asset is generated with a smart contract using the identification information, wherein the smart contract is a computer program or protocol stored on the distributed ledger.

12. The method of claim 5, wherein the identification information is stored separately from the distributed ledger.

* * * * *

UNITED STATES PATENT AND TRADEMARK OFFICE
CERTIFICATE OF CORRECTION

| | | |
|---|---|---|
| PATENT NO. | : 11,799,667 B1 | Page 1 of 1 |
| APPLICATION NO. | : 18/061708 | |
| DATED | : October 24, 2023 | |
| INVENTOR(S) | : Brett Laszlo Nagy et al. | |

It is certified that error appears in the above-identified patent and that said Letters Patent is hereby corrected as shown below:

On the Title Page

Item (72) Inventors:
After "Philip Gerard Coady, Sammamish, WA (US)" insert --; Kunal Sanjay Sheth, Saratoga, CA (US)--, therefor.

Signed and Sealed this
Ninth Day of July, 2024

Katherine Kelly Vidal
*Director of the United States Patent and Trademark Office*